United States Patent [19]

Gilson et al.

[11] 4,195,802
[45] Apr. 1, 1980

[54] KINESTHETIC TACTILE DISPLAY SYSTEM

[75] Inventors: Richard D. Gilson; Ronald W. Ventola, both of Columbus, Ohio

[73] Assignee: The Ohio State University, Columbus, Ohio

[21] Appl. No.: 901,222

[22] Filed: Apr. 28, 1978

[51] Int. Cl.² ............................................... G08B 0000
[52] U.S. Cl. ................................ 244/17.13; 340/27 R; 340/407
[58] Field of Search .................... 35/12 B, 12 E, 12 K, 35/125, DIG. 2; 74/495; 244/17.13, 83 P; 318/628; 340/27, 407

[56] References Cited

U.S. PATENT DOCUMENTS

| 2,754,505 | 7/1956 | Kenyon | 340/407 |
| 2,808,659 | 10/1957 | Dehmel | 35/125 |
| 3,031,775 | 5/1962 | Cohen | 35/125 |
| 3,478,351 | 11/1969 | Fenton | 340/407 |
| 3,497,668 | 2/1970 | Hirsch | 340/407 |
| 3,987,438 | 10/1976 | Lindenmueller | 340/407 |
| 4,093,159 | 6/1978 | Gilson | 364/434 X |

Primary Examiner—Stephen G. Kunin
Attorney, Agent, or Firm—Millard, Cox & Smith

[57] ABSTRACT

An improved tactile control component for aircraft in which a tactile slide is positively driven through a box rack and pinion system from two oppositely disposed d.c. servo-motor assemblies. These assemblies include a relatively high RPM motor associated with a high gear reduction to achieve a positive and compelling tactile sensation at the hand of the pilot. Signals to the device are derived from the computer component of a flight director system or the like. To assure pilot tactile perception of the commands asserted through the apparatus, an emphasis is electronically inserted into command signals to accelerate the initial movement of the tactile slide at the inception of any given flight command. Through the relative positioning of the box racks in a mutually orthogonal disposition, the movement of the tactile slide may be along resultant vectors providing omnidirectional information particularly useful in controlling such components as the cyclic on rotary wing aircraft.

28 Claims, 15 Drawing Figures

KINESTHETIC TACTILE DISPLAY SYSTEM

BACKGROUND

A proficient, manual control over rotary wing and V/STOL aircraft is generally recognized by those engaged in the aerospace profession as a talent very elusive to achieve. The flight dynamics involved with such aircraft pose numerous engineering design problems within the control-stability arena. As a consequence, general helicopter design requires accommodation to a broad range of dynamic phenomena. For example, a dissymmetry of lift within the tip-path plane of the main rotor inherently is present and generally is corrected by blade flapping. A coning effect caused by the combined forces of lift and centrifugal force is exhibited by rotor blades during flight. A coriolis effect, manifested by a blade hunting action about the vertical (drag) hinge is caused by changes in rotor blade velocity in the plane of their rotation. The entire helicopter structure has a tendency to move in the direction of its tail rotor thrust (to the right) particularly when hovering. This movement often is referred to as "drift". As a helicopter approaches a hovering position close to ground, the rotor blades will be displacing air downwardly through the disk defined by their rotation at a rate faster than such wind can escape from the region immediately below the helicopter. This effect builds up a cushion of denser air between the ground and the craft, commonly referred to as "ground effect". Effective translational lift will be encountered wherein higher lift is experienced in forward flight or during hovering in a wind. The transverse flow effect encountered particularly during forward flight and most noticeable on entry into the above-noted effective translational lift is exhibited in a lift on a rearward portion of the rotor disk of greater extent than that on the forward part. In consequence of the natural gyroscopic precession of rotor blade dynamics, a tendency is exhibited for the helicopter to roll to the left. Where entry into effective translational lift is reached, the transverse flow effect may be accompanied by vibration. The helicopter also exhibits a pendular action in the course of normal flight. In effect, the craft behaves as if suspended from a single point and, inasmuch as it has considerable mass, it tends to freely oscillate either longitudinally or laterally in similar fashion as a pendulum. The pendular action can be exaggerated through overcontrolling, thus requiring somewhat moderate control stick handling. The technique of control over helicopter performance also is concerned with the load factor or actual load on the rotor blade during flight. This load factor and, hence apparent gross weight involves several considerations, including variations therein during banking maneuvers. Further, weight distribution variations occuring in the course of flight due to the consumption of fuel and like phenomena will have a continuing effect on the controlability of the craft.

To aid in piloting such rotary wing craft as well as relatively more stable fixed wing aircraft, the avionics industry has developed a number of aids. For example, a wide variety of automatic flight controls have been evolved as well as sophisticated read-out systems for offering the pilot both control and situational information. Situational information is that which exists in real time, showing the instantaneous flight condition of the aircraft. Control information is provided by flight director devices and the like which serve to apprise the pilot of when and how to carry out forthcoming flight maneuvers. For the most part, the readout of these devices is implemented by visual displays. However, difficulties with the use of the visual displays are encountered inasmuch as there are limits to the amount of visual information which the pilot can absorb and respond to with appropriate manual activity while still remaining alert to the other numerous l parameters and factors of flight imposing a simultaneous demand upon his visual attention. Particularly with the introduction of flight directors, there has been difficulty in integrating the array of visual information provided to reduce the pilot's requirement for scanning, while simultaneously maintaining visual clutter within the cockpit to a minimum. Many manufacturers of this equipment have resorted to a color coding of various display cues as an aid in relieving potential confusion or misinterpretation on the part of the pilot. Even where color coded systems are utilized, however, two levels of difficulties arise on the part of the pilot, in that control and situational information require a division of both visual and cognitive attention. For example, the pilot may be so busy that a task is programmed for the flight director, following which he forgets what he has directed the program to readout. Similarly, the pilot may "tunnel-in" perceptually on the visual command information readout, i.e. and attitude/director indicator, at the expense of observing other aspects of the total flight situation. Further the pilot may "tunnel-in" on the situational informational readout to the extent that he may forget to execute the commands of the director readout.

Investigators in the past have looked to the potential use of cutaneous devices, or readout signals by touch for communicating discrete control information to a pilot. For example, control stick shaking devices have been employed as a stall warning and the number of techniques have been investigated for continuous communication with the pilot, including a two-way vibrotactile communication system, a stomach-chest mounted "cross" of stimulators for information transfer and an airjet stimulator moving across the forehead. In this regard, reference is made to the following publications:

I. Hirsch, J., Shafer, J. H., and Eitan, A., "Experiments in Tactile Communication," 6th Annual Conference on Aviation and Astronautics, Haifu, Israel, 1964.

II. Levison, W. H. Tanner, R. B., and Triggs, T. J., "Evaluation of Tactual Displays for Flight Control," *Proceedings of the 9th Annual Conference on Manual Control,* M.I.T., Cambridge, Mass., 1973.

III. Bliss, J. C., Link, S. W., Mansfield, P. K., "Tactual Perception: Experiment and Models," Quarterly Report 1, Contract NAS2-3649, Stanford Research Institute, Menlo Park, Calif., Sept. 1966.

IV. Geldard, F. A., Ed. "Conference on Cutaneous Systems and Devices," *Psychonomic Monograph Supplement.* Monterey, Calif., Apr. 17–18, 1973.

V. Bliss, J. C., Ed., "Special Issue—Tactile Displays Conference," *IEEE Transactions on Man-Machine Systems,* Vol. MMS-11, No. 1, March 1970.

Additional reference is made to a copending application for U.S. Pat. No. 775,384 filed Mar. 7, 1977, entitled "Semi-Automatic Aircraft Control" by R. D. Gilson, now U.S. Pat. No. 4,093,159.

With respect to rotary wing aircraft, an unusual difficulty in achieving adequate control information transfer to the pilot is presented in connection with the manipulation of the cyclic component. A high frequency response is required of the pilot to achieve direct helicopter control utilizing this device. Consequently, the conventional visual readout devices exhibit pilot response and cognition difficulties. Needed particularly for such controls is a close stimulus-response compatibility, the control error (stimulus) being displayed on that same control actuator responsible for correcting the error (response). Further, the display readout must be of a compelling nature such that the pilot response becomes immediate. Additionally, any opportunity for display misalignment occuring often in connection with visual devices should be eliminated.

SUMMARY

The present invention is addressed to a tactile readout system and apparatus operating in conjunction with the hand manipulated control component of aircraft and other vehicles. Having a particularly valuable application in conjunction with the cyclic of helicopters, the apparatus includes a tactile slide movable omni-directionally in coplanar relationship with a plane transverse to a given longitudinal axis of the control actuation being held four degrees of freedom (two degrees in plus and minus direction). Control command of movements asserted from the slide to the hand are positive and forceful, resulting in a compelling tactile input to the operator.

In a preferred embodiment, the system provides an emphasis in the initial movement of the slide to amplify the assertion of a control command. This emphasis is carried out through the development of a transient pulse at the insertion of any command signal to the servo-motors driving the tactile slide. In effect, a short thrust or accelerative burst is developed to enhance the operator's perception of a command. The system affords such advantageous control that helicopter pilots have carried out hovering maneuvers utilizing the system and apparatus without any reference to visual flight informational input.

Another object and feature of the invention provides an improved control apparatus for use in connection with rotary wing aircraft. This apparatus includes a tactile readout member which may be present as a slide which is mounted upon the cyclic control component of the aircraft in the vicinity of the hand grip portion thereof. The member has an outwardly disposed periphery which is shaped compatibly with the grip portion and is driveable omni-directionally and co-planarly with a plane transverse to the longitudinal axis of the grip portion. First and second servo-motors are mounted upon the cyclic which are energizable to impart rotary motion to corresponding first and second pinions positioned thereupon. The apparatus further incorporates a rack which is associated in driving relationship with the tactile readout member and is engaged in driven relationship with the first motor and, preferably, is present as a box rack formed within a rectangular opening within the tactile readout member. A second rack associated in driving relationship with the tactile readout member is positioned orthogonally with respect to the first rack and is engaged in driven relationship with the pinion of the second motor. This second rack preferably is present as a box rack. With the arrangement thus described, the tactile readout member, which may be present as a slide having a generally circular periphery, may be driven in any relative component of two degrees of freedom in a very positive manner. In the latter regard, the positive drive of the system is enhanced through the selection of d.c. servomotors having relatively high rotational outputs, i.e. greater than about 10,000 RPM. This motor output is associated with a reduction gear train having a reduction ratio of from about 100 to 200 to enhance the drive effectiveness of the apparatus. This latter effectiveness is particularly valuable in aircraft applications wherein the pilot's hand may be gloved and/or grip upon the control member or cyclic may be tense and non-responsive to tactilly derive commands of lesser capability.

As another feature and object, the apparatus of the invention provides upper and lower mounting assemblies which serve to retain the motor and gear train assemblies in an alignment about the axis of the control actuation. These mounting assemblies are mutually spaced and exhibit flat surfaces adjacent to corresponding opposite surfaces of the tactile slide which is driven between them. Additionally, the mounting assemblies support potentiometers utilized to derive feedback information as to the degree of movement imparted to the tactile slides. The mounting assemblies are united by four spacers which serve the additional purpose of guiding the box racks serving to drive the tactile slide in a manner wherein the racks are movable along orthogonally opposed rectangular paths. The resultant drive arrangement permits the tactile slide to move along any resultant vector of those rectangular coordinate paths to afford an integrated tactile readout for two aspects of attitude control over an aircraft or vehicle.

Other objects of the invention will, in part, be obvious and will, in part, appear hereinafter.

The invention, accordingly, comprises the apparatus and system possessing the construction, combination of elements, and arrangement of parts which are exemplified in the following detailed disclosure.

For a fuller understanding of the nature and object of the invention reference should be had to the following detailed description taken in connection with the accompanying drawings.

DETAILED DESCRIPTION

Figure 1:
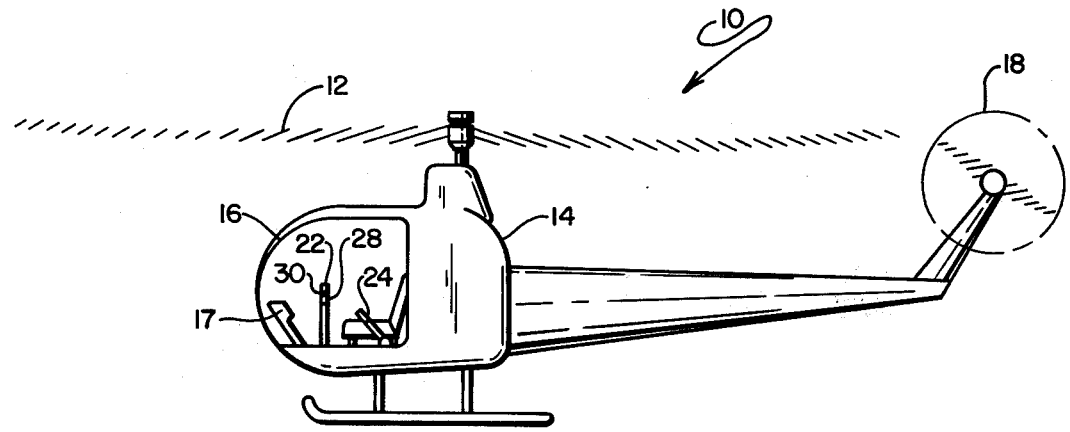
FIG. 1 is a schematic side elevational view of a helicopter showing the positioning of various components thereof.
Figure 2:
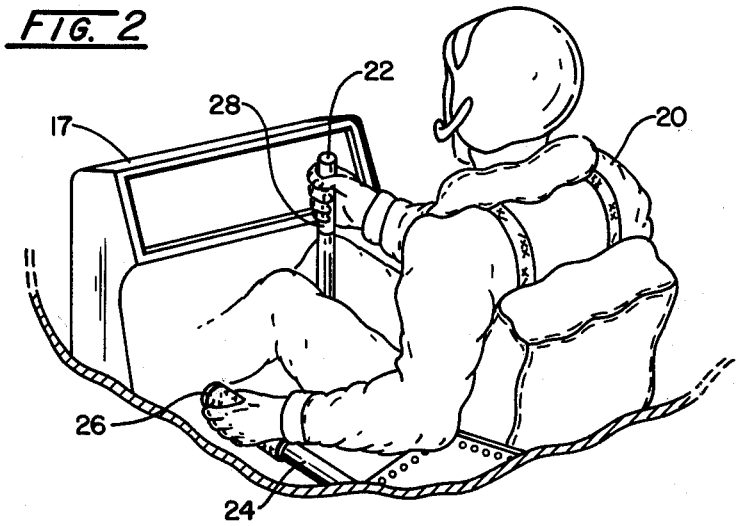
FIG. 2 is a schematic fragmentary view of a pilot within the helicopter of FIG. 1, showing the positioning of right and left hands respectively upon the cyclic and collective control components.

Referring to FIG. 1, a helicopter is represented in somewhat schematic fashion at 10. In conventional fashion, the helicopter 10 includes main rotor blades 12 depicted as rotating to define the rotor disk for generating requisite lift and thrust depending upon the attitude of the craft. The fuselage 14 of the craft includes a cockpit toward the forward end at 16 and extends rearwardly to support an auxilliary rotor 18 shown in a rotational fashion and serving to compensate for the torque exerted from the main rotor blades 12. Within the cockpit 16 is a control panel 17 which provides visual readout flight information and, in many aircraft, may include a flight director system having a visual readout for commanding the pilot to carry out computerized maneuvers. In piloting the craft, the pilot, as represented in FIG. 2 at 20, manipulates pedals (not shown) to control the pitch of auxillary rotor 18 as well as a cyclic 22 and a collective 24. Generally, the grip portion 26 of collector 24 includes a rotatable throttle connection for adjusting the RPM of the motor drive to rotor blades 12. Similarly, the uppermost portion 28 of the cyclic 22 is formed as a hand graspable grip over which the pilot maintains control using his right hand.

The collective pitch lever or stick 24 always is located by the left side of the pilot's seat and is operated with the left hand. This lever moves up and down, pivoting about the aft end thereof and, through a series of mechanical linkages, changes the pitch angle of the main rotor blades. As the collective pitch level is raised, there is a simultaneous and equal increase in the pitch angle of all of the main rotor blades and the converse activity is carried out when the lever is lowered. As is apparent, altering the pitch also alters the angle of attack of each rotor blade. To compensate for drag increases with increases in angle of attack, the RPM of rotor 12 would tend to decrease without an input to the throttle of the motor of the craft. For this reason a coordinating innerconnection or governor is made between collective 24 and the main throttle function of the motor.

The total lift-thrust force exerted by rotor 12 always is perpendicular to the tip-path plane of those rotors. When the tip-path plane is tilted away from horizontal, the lift-thrust force is divided into two components, a horizontally active force, referred to as "thrust"; and the upward acting force, referred to as "lift". The purpose of the cyclic pitch control at lever 28 is to tilt the tip-path plane of rotors 12 in the direction of desired horizontal movement. This thrust component then serves to pull the helicopter 10 in the direction of rotor tilt. The cyclic control has no effect on the magnitude of the total lift-thrust force, but changes the direction of this force, thus controlling the attitute and air speed of helicopter 10. A mechanical linkage between cyclic 22 and the swash plate of rotor 12 provides that the maximum downward deflection of the blades is reached in the direction which it is displaced and vice versa for the maximum upward displacement. The linkage serves to decrease the pitch angle of the rotor blades 90° before they reach the direction of displacement of the cyclic 22 and increase the pitch angle of the rotor blades 90° after they pass the direction of displacement of the cyclic. Inasmush as rotary wing aircraft as at 10 are not inherently stable platforms as are fixed wing aircraft, the pilot 20 is required to maintain constant contact with cyclic 22 at grip portion 28 as well as constant alertness to the above-described many faceted dynamic influences simultaneously co-acting in the course of helicopter flight.

Figure 3:
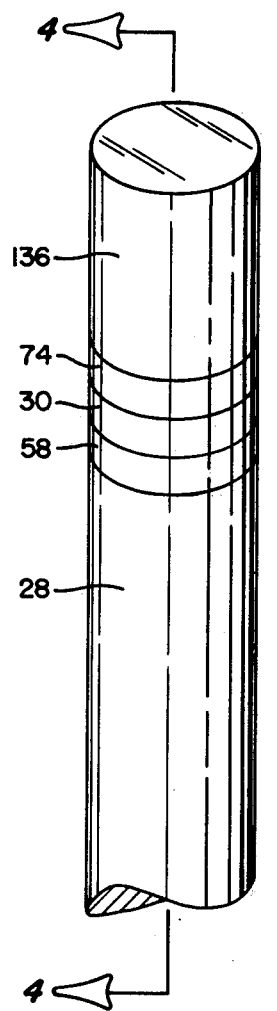
FIG. 3 is a perspective view of the grip portion of the cyclic of the helicopter of FIGS. 1 and 2.

Looking to FIG. 3, a perspective view of the hand grip portion 28 of cyclic 22 incorporating the tactile readout features of the invention is revealed. Note that the grip portion is of generally right cylindrical configuration, however, it may be formed having the contour grip structures conventionally in the stick control components of aircraft. At that position upon the grip portion 28 where the thumb and forefinger of the pilot's right hand grasp portion 28, there is located a tactile readout member 30 which is present as a slide or disk. Slide 30 is represented in the figure as having a circular outer periphery which is oriented in alignment with the corresponding surface of grip portion 28. This flush position of the slide 30 is one wherein the pilot is tactually apprised that no correctional movement of cyclic 22 is required, his hand feeling the flush position of the slide with respect to corresponding surfaces at grip 28. Readout to the pilot by slide 30 is one acquired by his tactile perception as opposed to his visual perception. While this perception of "touch" or "feeling" has long been classified as one of the five special senses, investigators have developed an intricate history of these sensations relating to the skin and its stimuli. Such sensations have been grouped qualitatively on the basis of their observational similarity, as well as from the standpoint of stimulus with respect to the objects or forms of physical energy that set off the stimulus, or anatomically in accordance with the system of sense organs or tissues initiating the sensation. Response of the anatomically sensing system to movement of slide 30 is a multi-patterned one, involving nerve terminations in the skin layers, the sensed angular reorientation of bones and muscular tissue at joints and many other aspects including deeper specialized sense organs. For a detailed discourse concerning these aspects, reference is made to the following publications:

VI. "The Human Senses" by F. A. Geldard, Second Edition, Chapter 9, The Skin and Its Stimulae, 1972 by John Wylie and Sons Inc.

VII. "The Senses Considered as Perceptual Systems" by Gibson, Chapter 7, "The Capabilities of the Haptic-Somatic System", Houghton-Mifflin Co., Boston 1966.

For the tactile form of readout to be effective, particularly in the case of helicopter control, it is necessary that the tactile input to the right hand of the pilot from the slide 30 be one which is psychologically compelling in nature. For example, the pilot response should be one essentially automatic in nature, his thought process not being one drawn to the necessity of identifying that a stimulus has been felt and that it then is proper for him to maneuver the cyclic 22 into the location ordered by the tactile impulse. Further, in typical helicopter flight, because of the above-described many faceted dynamic control input required, the frequency of commands which are received for slide 30 is such that corrections must be carried out in a highly prompt fashion, i.e. the motor response of the pilot must be highly tuned to this information as it reaches his hand. Of advantage in this regard, the proximity of signal with resultant physical maneuvering of the control actuator is ideal, the control being asserted in the vicinity of reception of the control command. It is this very positive tactile command input to the pilot's hand which is a particularly important feature of the invention.

Figure 4:
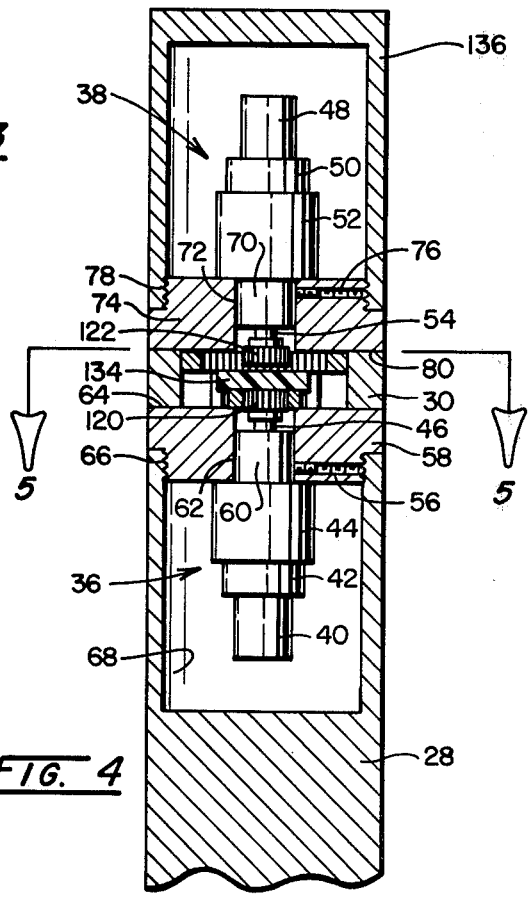
FIG. 4 is a sectional view taken through the plane 4—4 shown in FIG. 3.
Figure 6:
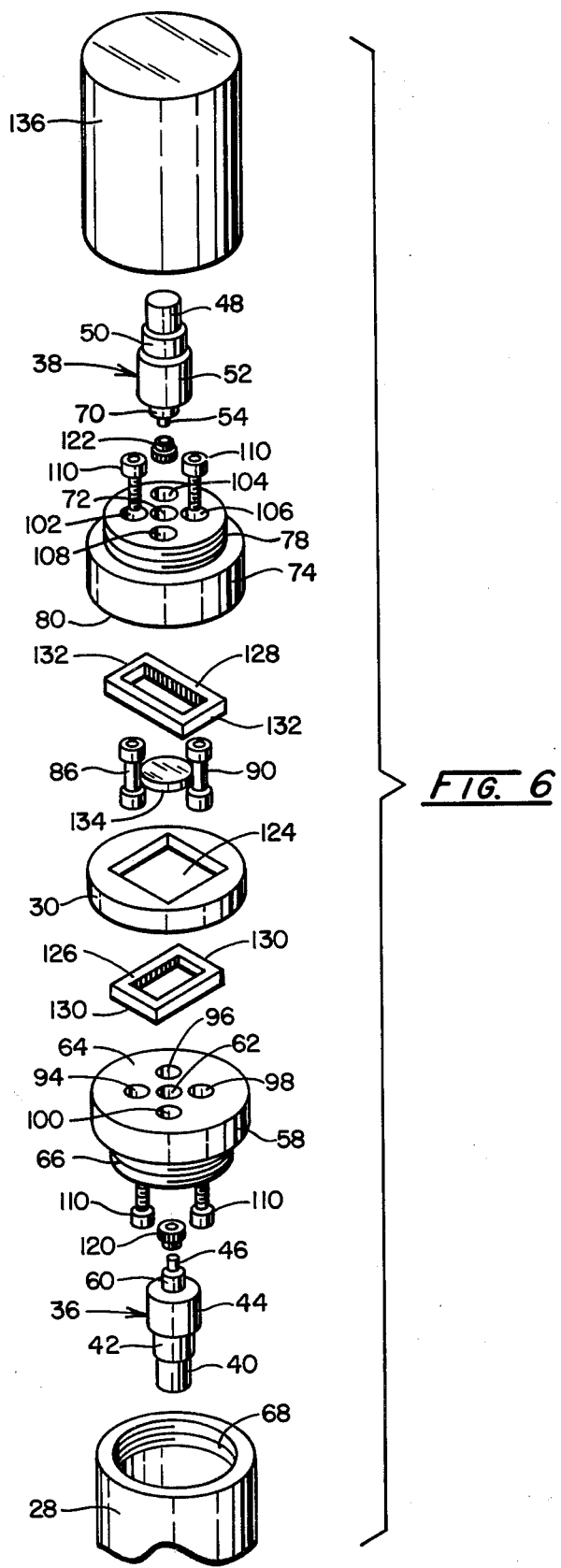
FIG. 6 is an exploded perspective view of the tactile readout assembly of the invention.

Looking to FIGS. 4 and 6, the drive arrangement for manipulating tactile readout member or slide 30 is revealed in detail. The assemblage for driving slide 30 is provided through the utilization of two axially aligned and mutually oppositely disposed d.c. servo-motor assemblies 36 and 38. Assemblies 36 and 38 are identically structured, for example, assembly 36 including a d.c. servo-motor 40 the output of which is coupled in in-line fashion with a gear train or gear head 42 which, in turn, has an output coupled through appropriate adapters to a potentiometer 44. The rotational output (wiper) of potentiometer 44, emanating from motor 40 and gear train 42, is provided at a shaft 46. In similar fashion, assembly 38 includes d.c. servo-motor 48 which is connected in in-line fashion with gear train or gear head 50, the output of which, in turn, rotates the wiper arrangement of a potentiometer 52 and the assemblage provides a rotational output at shaft 54. Assembly 36 is mounted through the use of a set screw 56 to a cylindrically shaped bottom mounting plate 58. In this regard, the upwardly disposed mounting shaft portion 60 of assembly 36 is inserted within a centrally disposed bore 62 within mounting plate 58. Mounting plate 58 also includes an upwardly disposed flat surface 64 and a necked down portion 66, the periphery of which is threaded as shown.

In similar fashion, servo-motor assembly 38 includes a mounting shaft portion 70 which nests within the centrally disposed bore 72 of a top mounting plate 74. As before, the assembly 38 is fixed to mounting plate 74 through the use of a set screw 76 (FIG. 4). Fabricated substantially identically with bottom mounting plate 58, mounting plate 74 is formed having a generally cylindrical periphery, a threaded necked down portion 78 and a downwardly disposed flat surface 80.

Bottom mounting plate 58 is connected to the lower portion 28 of cyclic 22 by threadable engagement with the upwardly disposed internal portion of bore 68. Top mounting plate 74 is supported a predetermined distance above mounting plate 58 by four pin-like spacers 86, 88, 90 and 92, two of which are shown in FIG. 6 and the positions of which are shown in section in FIG. 5. Each of these spacers are identically structured and, as revealed in FIG. 6, each is formed having an enlarged cylindrical end portion disposed at opposite ends therewith and incorporating a tapped bore. These enlarged portions fit closely within corresponding bores formed inwardly from flat surfaces 64 and 80 of respective mounting plates 58 and 74. FIG. 6 shows these bores at 94, 96, 98 and 100 within mounting plate 58 and at 102, 104, 106 and 108 within mounting plate 80. The above listed bores are formed such that the end portions of the spacers 86, 88, 90 and 92 nest against a flange within the mounting plates (not shown) and permit the attachment of the spacers to the mounting plates 58 and 80 through the utilization of Alan head screws, four of which are revealed at 110 in FIG. 6. With the arrangement shown, flat surface 80 of top mounting plate 74 is positioned parallel to and spaced from flat surface 64 of bottom mounting plate 58 a distance permitting slide 30 to slideably move freely yet snugly between and in adjacency with the surfaces.

Drive from the servo-motor assemblies 36 and 38 is imparted to the slide 30 by pinion and box rack assemblies. In this regard, a pinion 120 is journaled over and hinged to the output shaft 46 of assembly 36, while an identical pinion 122 is fixed to output shaft 54 of assembly 38 by a pin connection (not shown). As revealed in FIG. 4, pinion 120 is positioned such that the teeth thereof extend just above flat surface 64 of bottom mounting plate 58. Similarly, pinion 122 is mounted such that the teeth thereof extend just outwardly from the flat surface 80 of top mounting plate 74.

Figure 5:
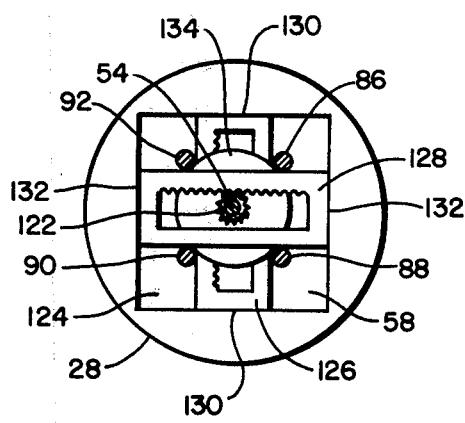
FIG. 5 is a partial sectional view of the cyclic shown in FIG. 4 taken through the plane 5—5 represented therein.

As is shown in FIGS. 5 and 6, the region within which these pinions may extend is limited and defined by a rectangular opening 124 formed within slide 30. The peripheral dimensions of opening 124 as well as the thickness of slide 30 are chosen to accommodate pinions 120 and 122 and the two orthogonally oriented box racks 126 and 128. FIG. 5 illustrates that box racks 126 and 128 are identically dimensioned and are formed as rectangular steel frames having inner rectangular openings dimensioned so as to receive an appropriate pinion 120 or 122 and permit the pinions to engage the teeth of an associated inwardly facing rack portion of the assemblages. Note, that the outwardly disposed edges of each box rack, for example as at 130 in case of rack 126, nest in abutting relationship against the corresponding edges of opening 124. Further, it may be noted that the racks are centered in rectangular coordinate defining fasion with respect to the longitudinal axis established along grip portion 28 and through the shafts 54 and 46 of respective servo-motor assemblies 38 and 36. FIG. 5 further reveals that spacers 86, 88, 90 and 92 are positioned at the corners of an imaginary rectangle and abut against the outwardly disposed lengthwise edges of each of the box racks 126 and 128. In consequence, the racks 126 and 128 are constrained such that they may move only in two orthogonally disposed rectangular coordinate directions. A disk-shaped bushing 134 is positioned intermediate the racks and is retained by the four spacers 186, 188, 190 and 192 to provide appropriate isolation of the rack and pinion interconnections of the assembly. This bushing may be formed of nylon, teflon or the like to permit the facile sliding of the racks along the designated rectangular coordinate directions. A "box" rack configuration specifically is selected for the instant application, inasmuch as that configuration avoids binding or distortion difficulties which otherwise may be encountered in developing the positive drive required for the tactile readout feature of the invention. The upwardly disposed servo-motor assembly 38 as well as the upward surfaces of mounting plate 74 are covered with a cylindrically shaped upper cap or housing 146 which is threadably engaged with corresponding threads within necked down portion 78 of the mounting plate 54. As is apparent, cap 136 serves to provide desired smooth continuity in the grip portion 28 of cyclic 22.

The general mechanical operation of the apparatus provides for the selective energizations of servo-motors 40 and 48 in response to a command signal input. These motors turn at a high RPM to, in turn, drive the gear trains as at 42 and 50, which drive is imparted through potentiometers 44 and 52 to pinions 120 and 122. The degree of revolution of the latter pinions is electrically tracked by virtue of the wiper arm rotation of respective potentiometers as at 44 and 52. When a null condition is established within control circuitry of the system, energization of the appropriate motor 40 or 48 or both is halted to complete the command. As is apparent from FIG. 5, a simultaneous drive imparted to box racks 126 and 128 will convert the rectangular coordinate movements thereof into a resultant vector movement depending upon the degree of drive imparted to each rack. Slide 30 then will move an appropriate extent in any command direction into the pilot's hand with a highly positive force. The degree of movement required for the cyclic 22 or equivalent control component is determined by the extent of movement of slide 30 from the corresponding smooth periphery of grip portion 28 including the peripheral surfaces of mounting surfaces 58 and 74. As is apparent, the pilot judges this relationship tactilly with respect to the degree of displacement of the slide 30 from this corresponding peripheral surface.

To achieve the necessary positive drive for this purpose, particularly in emergency or hazard related conditions wherein the pilot may be tense, it is perferable to utilize the noted relatively high RPM motor drive in combination with a correspondingly relatively high gear ratio for gear trains 44 and 52. For example, a motor rotational output greater than about 10,000 RPM is desired in combination with a gear ratio of from between about 100 and 200. A highly successful unit has been tested wherein motors 40 and 48 are selected to provide an output at 10,700 RPM and wherein a gear ratio at gear trains 42 and 50 is selected at 141. In this regard, such servo-motor assemblies as at 36 and 38 providing the above outputs are a servo-system identified as Model 927 marketed by Beckman Instruments, Inc., Helipot Division, Fullerton, Calif., 92634.

Figure 7:
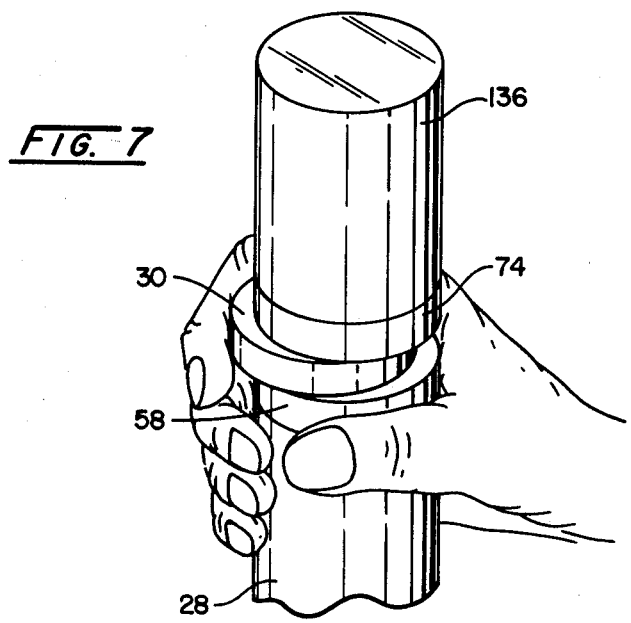
FIGS. 7, 8, 9 and 10 are pictorial representations of the hand of a pilot and the tactile readout apparatus of the invention in various operational configurations.
Figure 8:
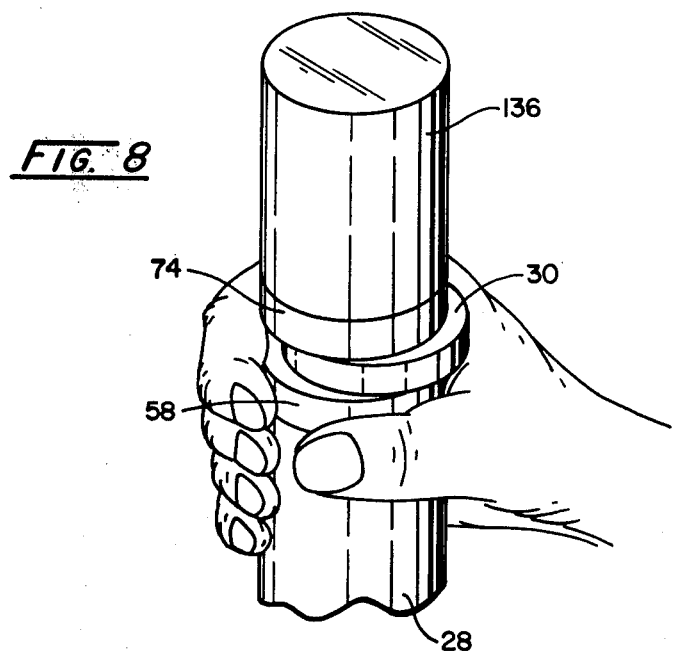
Figure 9:
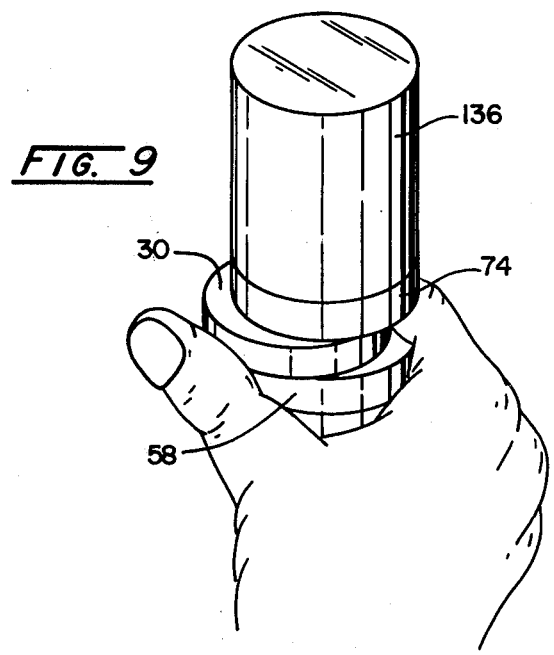
Figure 10:
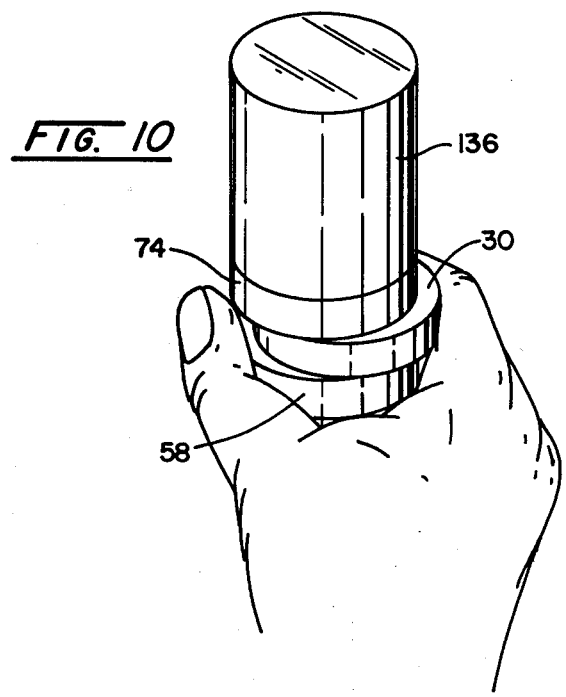

Looking to FIGS. 7–10, various orientations of the slide 30 with respect to the hand of a pilot are pictorially represented. FIG. 7 shows the slide providing a command in a generally forward direction, the slide urging the pilot's index finger forwardly, thus, providing both pressure and altering the joint angulation of that finger. FIG. 8 shows a general reversal of the above form of movement, the slide 30 being urged into the web portion of the hand between the thumb and the forefinger. FIG. 9 shows a lateral displacement of the slide, the angulation of the point of the thumb being altered as well as a pressure being exerted there against and FIG. 10 shows the opposite directional movement of the slot with respect to FIG. 9, the forefinger being distorted such that there is an angulation in the joints thereof and pressure being exerted in the course of the slide reaching the position shown. All of the orientations of slide 30 shown in these latter figures are extreme orientations, in cardinal directions the amount of displacement in actual flight generally being of lesser extent. As is noted above, with the instant invention, the slide is omnidirectional in its capabilities, being able to move along any resultant vector corresponding to the cardinal command signal information being presented.

Figure 13:
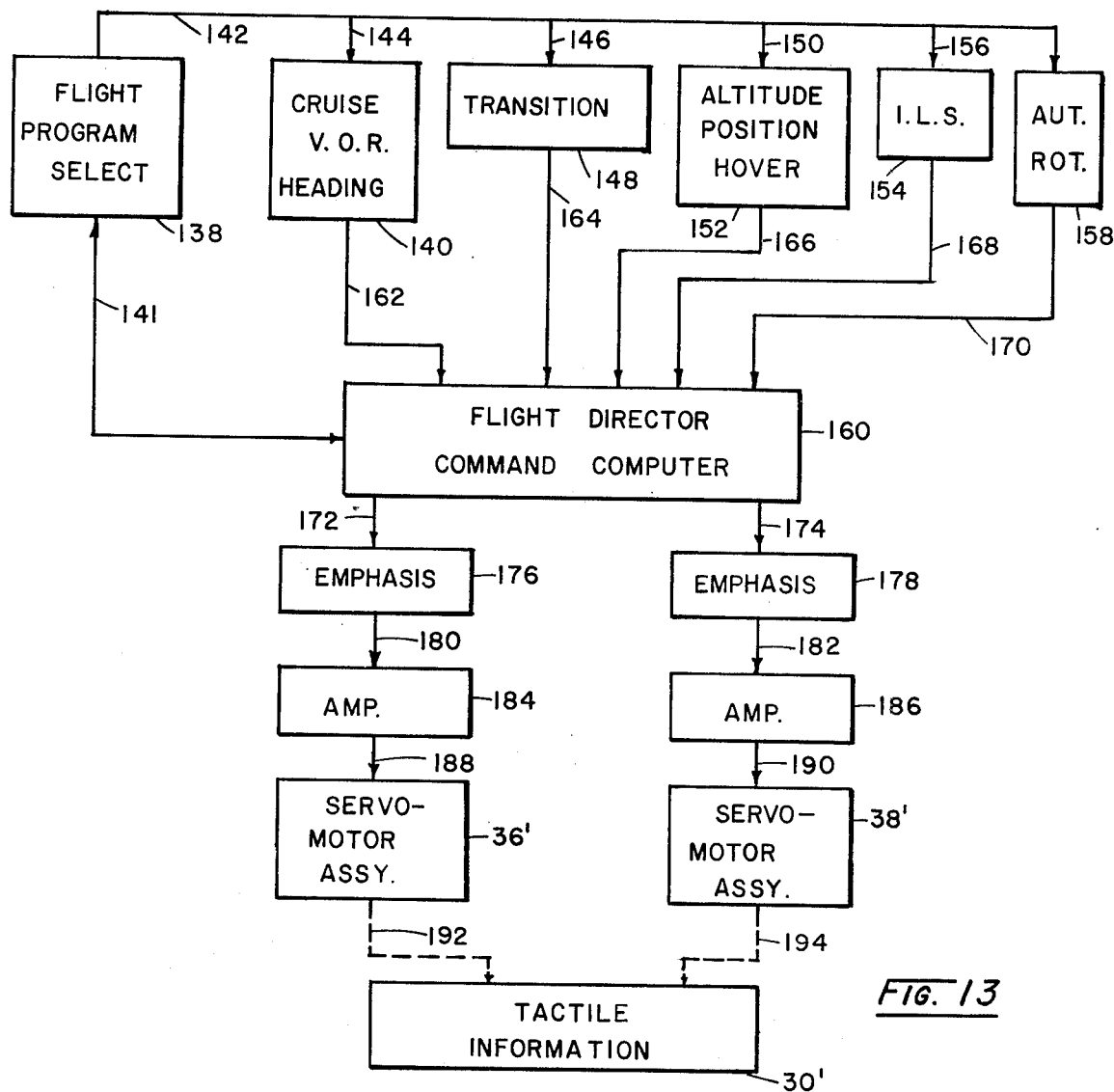
FIG. 13 is a block diagram showing various flight director functions, for a helicopter the emphasis and amplification stages and ultimate readout of the system of the invention.

The system which evolve the command signals acted upon by the tactile readout apparatus of the invention generally are identified as "flight directors". These control systems derive computed commands under a number of control programs which are selected by the pilot. A typical system for fixed-wing aircraft is identified as: Sperry Three Axis Reference System, STARS/SPZ—200 Flight Director, marketed by Sperry Flight Systems, a Division of Sperry Rand Corporation, Phoenix, Ariz. Referring to FIG. 13, such a flight director system for helicopter operation is schematically revealed in combination with various functions associated therewith for use in connection with the instant tactile control arrangement. Generally, the cockpit instrument panel of the helicopter will incorporate a flight program select device as represented by block 138. This device will provide a plurality of selector switches or push buttons by which the pilot may activate any of several flight director control programs. For example, by appropriate selection at input 138, the pilot may choose a flight program for cruising, giving proper attitude and VOR or heading command information as represented at block 140. The command line from program select 138 to block 140 is represented by lines 142 and 144, while enabling signals are passed along line 141. When the pilot proceeds to alter from one program to the next, very often, a transistional phase of flight command is required as represented at block 146. Accordingly, that program is selected at input 138 and the appropriate enabling signal is asserted from lines 142 and 146 to the transition program function 148. In similar manner, an appropriate selection at input 138 will assert commands through lines 142 and 150 to provide a predetermined attitude and position hover configuration for the helicopter. I.L.S. approaches may be programmed by function 154 following a program selection thereof at function 138 as asserted from lines 142 and 156. Similarly, emergency maneuvering under autorotation conditions or the like may be programmed as indicated at block 158. Such an input from selector function 138 is represented by line 142. When such information is selected and activated, the command signals emanating therefrom are treated by a flight director computer as represented by block 160, block 160 being associated with various functions 140, 146, 152, 154 and 158 by respective lines 162, 164, 166, 168 and 170. The output signals from computer 160 are shown being directed through to output lines 172 and 174. The signals at these lines will represent coordinate aspects of attitude requiring movement of cyclic 22. It is these two coordinate signals for pitch and roll which are utilized to activate d.c. servomotor 40 and 48. Generally, the signals are present as variations of voltage level.

Figure 12:
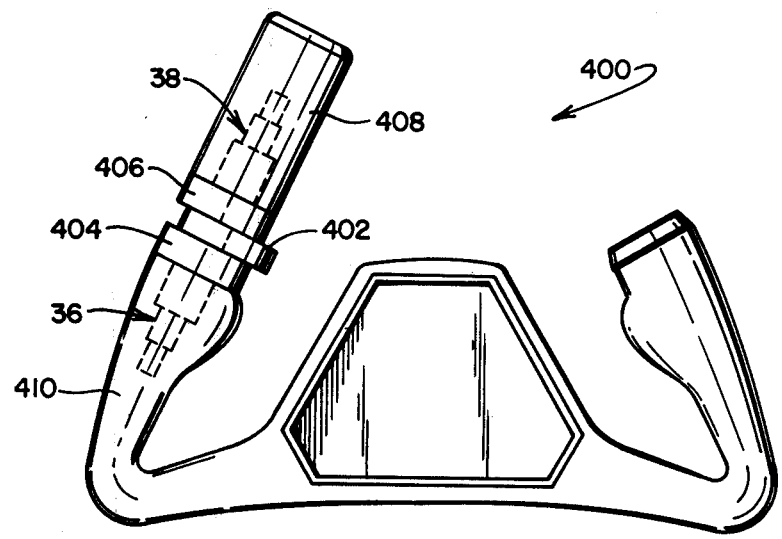
FIG. 12 is a plan view of a fixed-wing aircraft yoke incorporating the tactile readout appratus of the invention.

In accordance with the instant invention, the command signals at lines 172 and 174 are pretreated in that they are provided an initial emphasis. This emphasis is translated into a motor drive velocity or accelerative burst of motion such that the pilot's first tactile sensation is one of a sudden movement emphasizing the direction of small control errors. Following this short accelerative burst, the movement of slide 30 continues at a smooth or somewhat steady velocity until halted. Accordingly, in FIG. 12, the command signals at lines 172 and 174 are shown directed into emphasis circuit functions 176 and 178. The thus emphasized signal at blocks 176 and 178 is directed through respective lines 180 and 182 to separate amplification stages represented respectively by blocks 184 and 186. Upon being appropriately amplified the servo-motor assemblies 36 and 38 are energized through respective lines 188 and 190. In FIG. 12, the servo-motor functions are represented by the same numeration utilized in the earlier figures, but primed, i.e. 36' and 38'. The energization of these assemblies result in a translation of the tactile slide 30 along a resultant vector determined by the extent of drive asserted into box racks 126 and 128. This mechanical control is represented by dashed lines 192 and 194 leading, respectively, from servo assemblies 36' and 38' to the tactile display embodied by slide 30 and represented in the figure by block 30'.

Amplification stages 184 and 186 are typically identical in design as well as are the respective related emphasis components 176 and 178. Such an emphasis and amplification function is represented in the schematic circuit diagram shown in FIG. 11. Referring to that figure, a d.c. servo-motor is represented at 190 which may represent either motor 40 or 48 described in connection with earlier figures. Motor 190 is shown coupled between power input leads 192 and 194 and is provided having a mechanical connection represented by dashed line 196 to a potentiometer shown generally at 198. As is apparent, potentiometer 198 corresponds with either of those described above at 44 and 52. The wiper component of potentiometer 198 is revealed at 200 in connection with line 202. Wiper arm 200 is shown in movable contact with the schematically portrayed winding 204 of potentiometer 198, this winding extending between ground and the full voltage level of the power supply of the aircraft and, as will become apparent, having a neutral or null condition at its midpoint corresponding with a position of tactile slide 30 wherein the periphery thereof is flush with the corresponding side surfaces of mounting plate 58 and 74.

Figure 11:
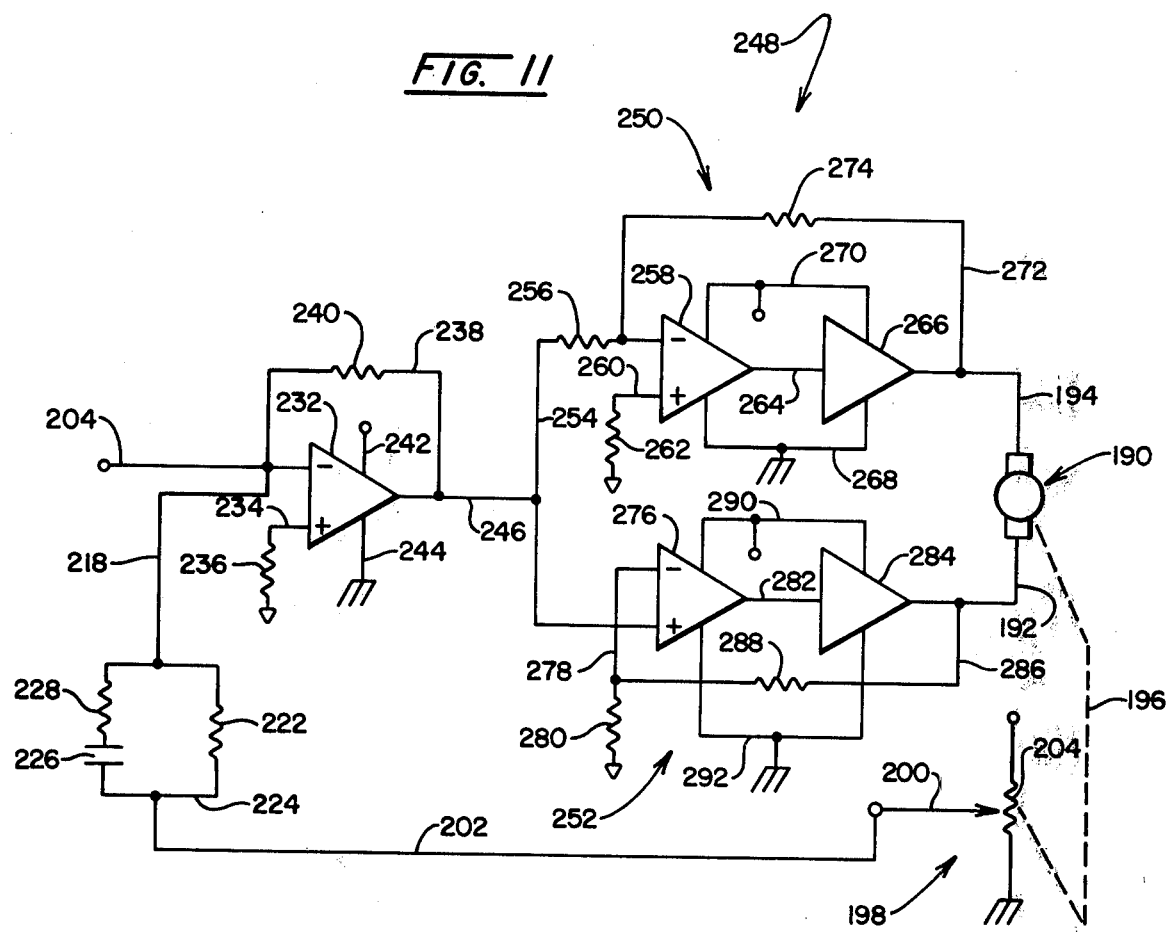
FIG. 11 is a schematic circuit diagram showing an amplification and emphasis circuit which may be utilized with the apparatus of the invention.

The power input to the circuit of FIG. 11 may be one derived from a power supply splitter network wherein an intermediate reference voltage is derived between ground and the full voltage available from the aircraft, typically about 14 volts d.c. This intermediate reference level would be one-half of that value or typically about 7 volts d.c. In the discourse to follow, the ground level is indicated by a ground symbol, the reference voltage level is represented by an arrowhead and the full voltage level input is represented by a small circle in keeping with conventional practice.

Figure 15:
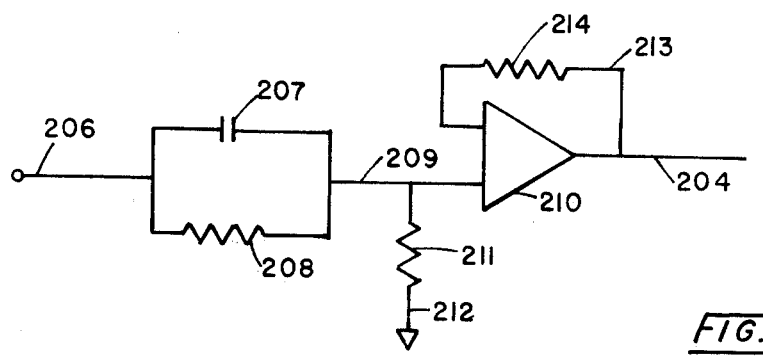
FIG. 15 is a schematic circuit diagram showing an emphasis function circuit utilized to comprise the emphasis blocks 176 and 178 of FIG. 13.

The emphasis feature as described in connection with blocks 176 and 178 of FIG. 13 may take a variety of forms, e.g., a differentiating function lead compensating or square root function being inserted at the input to the amplification stage. Operating upon the signals from the flight director and submitting the emphasized version thereof into line 204 and associated resistor 205, an emphasis function acceptable for the instant purpose is revealed in detail in FIG. 15. Looking to that figure, it may be observed that the input from the flight director along line 206 is passed along two paths, an a.c. one of which includes capacitor 207 and a d.c. one of which incorporates resistor 208. These paths serve in effect as a summing function the output of which is directed along line 209 to one input of an operational amplifier 210. A biasing resistor 211 within line 212 is connected between line 209 and reference voltage. Amplifier 210 incorporates a feedback loop including line 213 and bias resistor 214 and provides an output at line 204 which is not inverted and generally follows the input thereto, i.e. the amplifier 210 is coupled in a voltage follower configuration.

Returning to FIG. 11, the lead compensator function thus described serves to produce a short voltage emphasis at the commencement of the signal from the flight director which ultimately is evolved as an initial short acceleration of the output of motor 190. As this signal is imposed at line 204, servo-motor 190 is energized in one direction or the other from lines 192 and 194 to, in turn, move the location of wiper 200 with respect to the midpoint of winding 204. A resultant voltage signal is asserted representing position change of slide 30 through lines 202 and 218 to a summing junction 220. This signal is applied in d.c. coupling fashion through resistor 222 located within line 224 and, simultaneously, in differentiating fashion through capacitor 226 and resistor 228, the latter network being associated in parallel circuit relationship with resistor 222. The dual form of output present at line 218 includes both direct, d.c. coupling output through resistor 222 as well as a damping term through capacitor 226 and resistor 228 which provides a form of anticipation of the signal which serves to avoid hunting phenomena and the like within the system.

As noted above, the emphasized command signal is introduced at line 204 and is asserted through a resistor 205 to summing junction 220. This signal is of a polar sense opposite to the signal presented from line 218 to the junction 220 and the summed signal is introduced to the inverting input of a single ended input amplifier 232. The opposite or noninverting input to amplifier 232 is coupled to reference through line 234 and bias resistor 236. Amplifier 232 incorporates a feedback loop comprising line 238 having a feedback resistor 240, the latter resistor establishing the gain of the amplifier in conventional fashion. The amplifier additionally is coupled to the voltage or power source through line 242 and to ground through line 244, while its output is presented at line 246. This output, representing an error signal or voltage, is d.c. coupled to a power amplifier network represented generally at 248. Network 248 comprises two, push-pull, amplification stages revealed generally at 250 and 252. Accordingly, the command signal from line 246 is introduced from line 254 through an input resistor 256 to one input of an operational amplifier 258. The opposite input to amplifier 258 is coupled to reference through line 260 and bias resistor 262, while the output thereof is presented along line 264 to the input of a follower, power amplifier stage 266. Amplifiers 258 and 266 are connected to ground through line 268 and to power supply voltage through line 270. A feedback line 272 extends from the output of amplifier 266 at line 194 to input line 254 and incorporates a feedback resistor 274. As is apparent, the gain of stage 250 is established by the related values assigned to resistors 274 and 256.

Looking to stage 252, the command signal input at line 254 is introduced to the non-inverting input of an operational amplifier 276, while the inverting input thereto is coupled through line 278 and resistor 280 to reference. The output of amplifier 276 is present at line 282 which, in turn, is coupled with the input of power amplification stage 284. The output of amplification stage 284 is present at line 192 and is coupled through line 286 and feedback resistor 288 to input line 278. As provided in stage 250, power input to amplifiers 276 and 284 is supplied from a high voltage tap through line 290, while the amplifiers are coupled to ground through line 292. As is apparent from the foregoing description, any command signal introduced at line 246 is asserted upon d.c. servo-motor 190 in push-pull fashion to carry out a control command by the manipulation of tactile slide 30. Resultant movement of cyclic 22 provides an alteration in helicopter attitude to alter the input at line 206 to the system. This correction, in turn, causes motor 190 to be energized appropriately, thereby introducing a feedback signal through line 202 to summing junction 220. In the course of this correction, a null position ultimately may be achieved and the slide 30 assumes a position flush with respect to the peripheries of mounting plates 58 and 74 to apprise the pilot that a correct aircraft attitude has been achieved.

Figure 14:
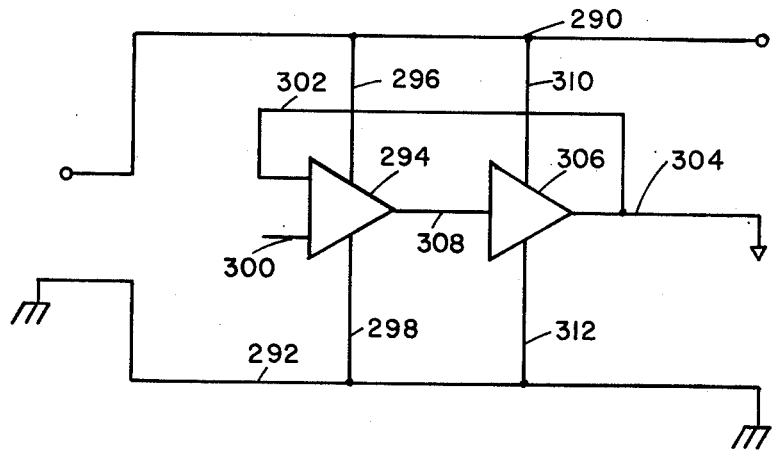
FIG. 14 is a schematic circuit diagram showing a power supply splitter circuit which may be utilized with the circuit of FIG. 11.

Looking to FIG. 14, a power supply splitter network is shown which may be utilized to derive the noted power, reference and ground couplings for the circuit described in connection with FIG. 11. In this regard, power leads 290 and 292 are coupled across the aircraft power supply and serve respectively as the upper level of voltage input and the ground level for the system. An operational amplifier 294 is coupled through respective lines 296 and 298 to lines 290 and 292. The non-inverting input to amplifier 294 is coupled through line 300 to reference voltage of flight director computer 160 (FIG. 13). The opposite or inverting input to amplifier 294 is coupled through line 302 to the output line 304 of power amplifier 306. The input of amplifier 306 is coupled through line 308 to the output of amplifier 294, while the former amplifier is connected to power leads 290 and 292 through respective lines 310 and 312. Thus connected, the output at line 304 represents a reference voltage operatable associated with the reference voltage of the flight director computer 160 and representing a voltage value intermediate the voltage across lines 290 and 292.

Looking to FIG. 12, an embodiment of the invention intended for use in connection with fixed wing aircraft is revealed by the conventional yoke control shown generally at 400. This control is grasped by one or both hands of the pilot and it is pushed forward to effect aircraft pitch downward (descent) and pulled rearwardly toward the pilot to effect an elevator controlled pitch upward climb in typical fashion. Similarly, the yoke is rotated to carry out a banking (turn) maneuver. The tactile readout assembly utilized with the yoke 400 is identical to that described hereinabove, incorporating a slide 402 which is mounted between a bottom mounting plate 404 and a top mounting plate 406. An upper cap or housing 408 is mounted upon top mounting plate as described hereinabove which retains the servo-motor assembly identical to that described above. Similarly, a portion of the hand gripping extension of yoke 400 at 410 is hollowed out to receive the lower servo-motor assembly.

Signals to the yoke arrangement 400 are derived from a flight director arrangement similar to that described in connection with FIG. 13. However, the form of information is that specific to fixed wing aircraft, the slide 402 apprising the operator both of an inward and outward movement for yoke 400 as well as a rotational turning movement for that yoke. In the latter regard, as the slide 402 extends inwardly as shown in FIG. 12, the pilot is directed to turn yoke 400 clockwise. Conversely, as the slide moves in a resultant vector toward the outwardly disposed surfaces of yoke 400, a counter-clockwise command is indicated. The form of flight director which may be utilized with yoke 400 may, for example, be a flight director system previously mentioned marketed by the Sperry Flight Systems Division of Sperry Rand Corporation.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. In piloted aircraft of a variety wherein a control component hand graspable about a longitudinal axis thereof is selectively manipulated to carry out attitude control and wherein a flight director system is provided to derive computed information in the form of first and second attitude vector signals representing aircraft control commands, the improved control system comprising:

a tactile readout member having an outwardly disposed periphery shaped to be grasped by a portion of the hand of the pilot and mounted at a location upon said component suited to permit simultaneous manual control movement thereof, said member being movable omni-directionally transversely to said longitudinal axis;

first motor means mounted upon said control component and having an output for drivably moving said member along a first rectangular coordinate path;

second motor means mounted upon said control component and having an output for drivably moving said member along a second rectangular coordinate path simultaneously with said movement along said first rectangular coordinate path, said second rectangular coordinate path being orthogonally disposed with respect to said first path;

first and second potentiometer means mounted upon said control component, having respective first and second outputs corresponding to the instant positions of said tactile readout member along said first and second rectangular coordinate paths;

first control circuit means including an emphasis stage for receiving said first attitude vector signals and responding to the receipt thereof to form a first input signal having a transient pulse component for developing an initial, accelerative output at said first motor means, an input summing stage for receiving said first input signal and said first potentiometer means first output and deriving a difference signal therefrom, and means for selectively energizing said first motor means in correspondence with said transient pulse component and said difference signal; and second control circuit means including an emphasis stage for receiving said second attitude vector signal and responding to the receipt thereof to form a second input signal having a transient pulse component for developing an initial, accelerative output at said second motor means, an input summing stage for receiving said second input signal and said second potentiometer means second output and deriving a second difference signal therefrom, and means for selectively energizing said second motor means in correspondence with said transient pulse component of said second input signal and said second difference signal.

2. The improved control system of claim 1 in which each said first and second servo-motor means comprises:

a d.c. servo-motor having a rotational output, when energized by said respective first and second control circuit means, of greater than about 10,000 RPM; and a gear train, having an input coupled with said servo-motor output, exhibiting a gear reduction ratio of between about 100 and 200 to develop said output for driveably moving said member.

3. The improved control system of claim 1 wherein the surface of said outwardly disposed periphery of said tactile readout member is configured to be positionable so as to conform in flush alignment with the surfaces of said hand graspable control components adjacent thereto.

4. The improved control system of claim 1 in which said first and second motor means are mutually oppositely disposed along said control component longitudinal axis.

5. The improved control system of claim 1 in which said tactile readout member comprises:
    a slide of predetermined thickness having a centrally disposed opening formed therein, the peripheral surfaces of which define a rectangle;
    a first rack and pinion drive assembly positioned within said slide opening in an orientation for driving said slide along said first rectangular coordinate path and connected to be driven by said first motor means output; and
    a second rack and pinion drive assembly positioned within said slide opening in an orientation orthogonal with respect to said first rack and pinion drive assembly for driving said slide along said second rectangular coordinate path and connected to be driven from said second motor means output.

6. The improved control system of claim 5 in which each said rack of said first and second rack and pinion drive assembly is present as a box rack.

7. The improved control system of claim 1 including:
    a first mounting assembly fixed to said control component for supportably retaining said first motor means, said first mounting assembly having a flat bearing surface oriented transversely to said longitudinal axis over which said slide is movable;
    a second mounting assembly spaced from said first mounting assembly for supportably retaining said second motor means and having a flat bearing surface oriented transversely to said longitudinal axis and positioned in adjacency with said slide, said slide being slidable thereacross; and
    spacer means for supporting said second mounting assembly in spaced relationship with respect to said first mounting assembly.

8. The improved control system of claim 7 in which said spacer means comprises four spacers fixed to and extending between said first and second mounting assemblies, said four spacers extending within said slide opening and oriented therewithin in adjacency with said box racks to constrain said first rack and pinion assembly to move along said first rectangular coordinate path and to constrain said second rack and pinion assembly to move along said second rectangular coordinate path.

9. The improved control system of claim 8 wherein the surface of said outwardly disposed periphery of said slide is configured to be positionable so as to conform in flush alignment with the corresponding adjacent surfaces of said first and second mounting assemblies.

10. The improved control system of claim 8 in which said first and second motor means are mutually oppositely disposed along said control component longitudinal axis.

11. In piloted rotary wing aircraft of a variety wherein a cyclic incorporating a hand grip portion having a given longitudinal axis is selectively manipulated to carry out attitude control, and wherein a flight control system is provided to derive computed information in the form of signals representing first and second rectangular coordinate path aircraft control vector commands, the improved control apparatus comprising:
    a tactile readout member mounted upon said cyclic about said given axis of the hand grip portion thereof and having an outwardly disposed periphery shaped to be contactable by a portion of the pilot's hand when grasping said hand grip portion, said member being drivably movable omnidirectionally and coplanarly with a plane transverse to said given longitudinal axis;
    first motor means mounted upon said cyclic and energizable to provide a rotary output at a first pinion;
    second motor means mounted upon said cyclic and energizable to provide a rotary output at a second pinion;
    first rack means associated in driving relationship with said readout member, engaged in driven relationship with said first pinion and oriented with respect to said cyclic to drive said readout member in a predetermined direction corresponding with said first coordinate path control vector; and
    second rack means associated in driving relationship with said readout member, positioned orthogonally with respect to said first rack means, engaged in driven relationship with said second pinion and oriented with respect to said cyclic to drive said readout member in a direction transverse to said predetermined direction and in correspondence with said second coordinate path control vector.

12. The improved control apparatus of claim 11 wherein the surface of said outwardly disposed periphery of said tactile readout member is configured so as to conform in flush alignment with the surfaces of the said hand grip portion adjacent thereto.

13. The improved control apparatus of claim 11 in which said first and second motor means are mutually oppositely disposed along said given longitudinal axis of said hand grip portion.

14. The improved control apparatus of claim 11 in which:
    said tactile readout member is present as a slide of predetermined thickness having a centrally disposed opening formed therein the peripheral surfaces of which define a rectangle; and
    said first and second rack means are configured to nest within and drivably abut against select, oppositely disposed ones of the said surfaces defining said rectangle.

15. The improved control apparatus of claim 14 including:
    a first mounting assembly fixed to said cyclic for supportively retaining said first motor means, said first mounting assembly having a flat bearing surface oriented transversely to said longitudinal axis over which said tactile readout slide is slidable;
    a second mounting assembly spaced from said first mounting assembly for supportively retaining said second motor means, said second mounting assembly having a flat surface oriented transversely to said longitudinal axis, spaced from said first mounting assembly bearing surface and in adjacency with a surface of said tactile readout slide; and
    spacer means for supporting said second mounting assembly in spaced relationship with respect to said first mounting assembly.

16. The improved control apparatus of claim 15 in which each said first and second rack means is present as a box rack.

17. The improved control apparatus of claim 16 in which said spacer means comprises four spacers fixed to and extending between said first and second mounting assemblies, said four spacers extending within said slide opening and oriented therewithin in adjacency with said box racks to constrain said first rack means to move along said first rectangular coordinate path and to constrain said second rack means to move along said second rectangular coordinate path.

18. The improved control apparatus of claim 15 wherein the surface of said outwardly disposed periphery of said tactile readout member slide is configured to be positionable so as to conform in flush alignment with the peripheral surfaces of said first and second mounting assemblies.

19. The improved control apparatus of claim 18 in which said first and second motor means are mutually oppositely disposed upon said given longitudinal axis of said hand grip portion.

20. The improved control system of claim 1 in which each said first and second motor means comprises:
 a d.c. servo-motor having a rotational output, when energized in correspondence with said aircraft control vector commands, of greater than about 10,000 RPM; and
 a gear train having an input coupled with said servo-motor output, exhibiting a gear reduction ratio selected between about 100 to 200 for developing said rotary output at an associated said first and second pinion.

21. A kinesthetic-tactile display apparatus for an operator controlled vehicle which has a control system including a control component hand graspable by said operator and manually movable to with four degrees of freedom to assert control in correspondence with computed commands represented as first and second orthogonally related rectangular coordinate signals, comprising:
 a tactile readout member mounted upon said control component symmetrically about a given axis thereof and having an outwardly disposed periphery shaped to be compatible with said component when the hand of said operator grasps said component in controlling relationship, said member being drivably movable omni-directional and coplanarly with a plane transverse to said given axis;
 first d.c. servo-motor means mounted upon said control component and energizable to provide a rotary output at a first pinion;
 second d.c. servo-motor means mounted upon said control component and energizable to provide a rotary output at a second pinion;
 first rack means associated in driving relationship with said readout member, engaged in driven relationship with said first pinion and oriented with respect to said control component to drive said readout member in a predetermined direction corresponding with said first rectangular coordinate signal; and
 second rack means associated in driving relationship with said readout member, positioned orthogonally with respect to said first rack means, engaged in driven relationship with said second pinion and oriented with respect to said control component to drive said readout member in a direction transverse to said predetermined direction and in correspondence with said second rectangular coordinate signal.

22. The kinesthetic-tactile display of claim 21 wherein the surface of said outwardly disposed periphery of said tactile readout member is configured so as to conform in flush alignment with the surfaces of said control component portion adjacent thereto.

23. The kinesthetic-tactile display apparatus of claim 21 in which said first and second motor means are oppositely disposed in mutually, facing relationship along said given axis of said control component.

24. The kinesthetic-tactile display apparatus of claim 21 in which:
 each said first and second d.c. servo-motor means, when energized in correspondence with said coordinate signals, provides a rotational output of greater than about 10,000 RPM; and
 each said first and second servo-motor means includes a gear train having an input coupled with each said servo-motor output which exhibits a gear reduction ratio selected between about 100–200 for developing said rotary output at an associated said first and second pinion.

25. The kinesthetic-tactile display apparatus of claim 21 in which:
 said tactile readout member is present as a slide of predetermined thickness having a centrally disposed opening formed therein, the peripheral surfaces of which define a rectangle; and
 said first and second rack means are configured to nest within and drivably abut against select, oppositely disposed ones of said surfaces defining said rectangle.

26. The kinesthetic-tactile display apparatus of claim 25 including:
 a first mounting assembly fixed to said control component for supportably retaining said first d.c. servo-motor means, said first mounting assembly having a flat bearing surface oriented transversely to said given longitudinal axis over which said tactile readout slide is slideable;
 a second mounting assembly spaced from said first mounting assembly for supportively retaining said second d.c. servo-motor means said second mounting assembly having a flat surface oriented transversely, to said given longitudinal axis, spaced from said first mounting assembly bearing surface and in adjacency with a surface of said tactile readout slide; and
 spacer means for supporting said second mounting assembly in spaced relationship with respect to said first mounting assembly.

27. The kinesthetic-tactile display apparatus of claim 26 in which each said first and second rack means is present as a box rack.

28. The kinesthetic-tactile display apparatus of claim 27 in which said spacer means comprises four spacers fixed to and extending between said first and second mounting assemblies, said four spacers extending within said slide opening and oriented therewithin in adjacency with said box racks to constrain said first rack means to move along a path corresponding with said first rectangular coordinate signal and to constrain said second rack means to move along a path corresponding with said second rectangular coordinate signal.

* * * * *